(12) United States Patent
Emek et al.

(10) Patent No.: US 10,956,301 B2
(45) Date of Patent: Mar. 23, 2021

(54) PRODUCTION DATA IN CONTINUOUS INTEGRATION FLOWS

(71) Applicant: OwnBackup LTD, Tel Aviv (IL)

(72) Inventors: Roy Emek, Tel Aviv (IL); Ariel Berkman, Hertzliya (IL)

(73) Assignee: OWNBACKUP LTD., Tel Aviv (IL)

( * ) Notice: Subject to any disclaimer, the term of this patent is extended or adjusted under 35 U.S.C. 154(b) by 0 days.

(21) Appl. No.: 16/503,426

(22) Filed: Jul. 3, 2019

(65) Prior Publication Data

US 2021/0004314 A1 Jan. 7, 2021

(51) Int. Cl.
*G06F 11/36* (2006.01)
*G06F 8/41* (2018.01)

(52) U.S. Cl.
CPC ............ *G06F 11/3616* (2013.01); *G06F 8/41* (2013.01); *G06F 11/3684* (2013.01)

(58) Field of Classification Search
None
See application file for complete search history.

(56) References Cited

U.S. PATENT DOCUMENTS

| | | | |
|---|---|---|---|
| 8,539,282 B1 | 9/2013 | Kabanov et al. | |
| 9,244,818 B1 | 1/2016 | Paleja | |
| 9,529,700 B2 | 12/2016 | Raghavan et al. | |
| 9,582,408 B1 | 2/2017 | Jayaraman et al. | |
| 9,721,116 B2 * | 8/2017 | Driesen | G06F 16/245 |
| 9,734,043 B2 | 8/2017 | Crova et al. | |
| 9,787,779 B2 | 10/2017 | Frank et al. | |
| 10,013,333 B2 | 7/2018 | Wood et al. | |
| 10,013,339 B2 | 7/2018 | Athinathan | |
| 10,042,636 B1 | 8/2018 | Srivastava et al. | |
| 10,042,742 B2 | 8/2018 | Jerrard-Dunne et al. | |
| 10,127,144 B2 | 11/2018 | Johnston et al. | |
| 10,223,658 B2 | 3/2019 | Cornilescu | |
| 2002/0101920 A1 * | 8/2002 | Choi | H04N 17/004 375/240 |
| 2010/0318481 A1 * | 12/2010 | Feynman | G06F 11/3684 706/12 |

(Continued)

FOREIGN PATENT DOCUMENTS

WO WO-2013115786 A1 * 8/2013 ............... G06F 8/60

OTHER PUBLICATIONS

Commvault, Seeding a Salesforce Sandbox, Dec. 12, 2018.
(Continued)

*Primary Examiner* — Philip Wang
(74) *Attorney, Agent, or Firm* — Kligler & Associates Patent Attorneys Ltd

(57) ABSTRACT

The present disclosure relates to software development and, more specifically, to continuous integration (CI) based software development systems, methods, and computer program products in which a system-under-test (SUT) is populated with production data that has been filtered or transformed, or both. In accordance with this approach, the filtered or transformed production test data can be automatically generated and seamlessly integrated into a continuous integration process. In some examples, the resulting filtered or transformed test data closely reflects real production data while, at the same time, consuming less data storage space and protecting an individual's sensitive information.

20 Claims, 6 Drawing Sheets

(56) References Cited

U.S. PATENT DOCUMENTS

| | | | |
|---|---|---|---|
| 2013/0139003 A1* | 5/2013 | Patwardhan | G06F 11/3684 714/32 |
| 2014/0143525 A1* | 5/2014 | Taylor, III | G01R 31/318371 712/227 |
| 2014/0310690 A1* | 10/2014 | Yang | G06F 11/3684 717/124 |
| 2015/0014306 A1 | 1/2015 | Tages | |
| 2016/0246706 A1 | 8/2016 | Sathyamurthy et al. | |
| 2016/0246838 A1* | 8/2016 | Li | G06F 11/3684 |
| 2016/0314062 A1 | 10/2016 | Castro | |
| 2017/0124487 A1 | 5/2017 | Szeto et al. | |
| 2017/0169370 A1 | 6/2017 | Cornilescu | |
| 2017/0269921 A1 | 9/2017 | Vicente et al. | |
| 2017/0286267 A1 | 10/2017 | Jain et al. | |
| 2018/0024914 A1 | 1/2018 | Yi | |
| 2018/0060210 A1 | 3/2018 | Pandey et al. | |
| 2018/0157485 A1 | 6/2018 | Kugler | |
| 2018/0260312 A1 | 9/2018 | Strachan et al. | |
| 2018/0357154 A1* | 12/2018 | Dolby | G06F 11/3684 |
| 2018/0365133 A1 | 12/2018 | Mitchell et al. | |
| 2019/0370010 A1* | 12/2019 | Iley | G06F 11/3696 |
| 2020/0104246 A1* | 4/2020 | Bhatt | G06F 11/3684 |
| 2020/0151319 A1* | 5/2020 | Sharma | G06F 21/6218 |

OTHER PUBLICATIONS

Ownbackup, Salesforce® Replication and Sandbox Seeding, Oct. 5, 2017.

Salesforce(R), Development Lifecycle Guide—Enterprise Development on the Force.com Platform, Version 35.0, Winter '16, Last Updated Dec. 29, 2015.

* cited by examiner

PRODUCTION DATA IN CONTINUOUS INTEGRATION FLOWS

BACKGROUND

The present disclosure relates to software development and, more specifically, to continuous integration software development systems, methods, and computer program products in which an application is developed iteratively. After one or several changes are made to the application code, a developer may commit the application code. After a commit of application code has been submitted, a continuous integration system performs one or more tests on the commit. Oftentimes, validating a commit of an application code involves executing a number of static or simulated tests with unchanging input data, which may be inconsistent with current real-world configurations of the systems under test.

SUMMARY

Example embodiments described herein provide information management systems and methods for utilizing production data in continuous integration flows. The present disclosure relates to software development and, more specifically, to continuous integration (CI) based software development systems, methods, and computer program products in which a system-under-test (SUT) (e.g., an untested software module or other source code) is populated with production data that has been filtered or transformed, or both. In accordance with this approach, the filtered or transformed production test data can be automatically generated and seamlessly integrated into a continuous integration process. In some examples, the resulting filtered or transformed test data closely reflects real production data while, at the same time, consuming less data storage space and protecting an individual's sensitive information (e.g., personally identifiable information, also referred to herein as "PII").

An embodiment features a method of developing an application implemented by computer hardware executing computer software. In accordance with this method, a continuous integration system detects a commit of an application code in a repository, where the commit represents a change in state of the application code. The continuous integration system compiles a build of the application based at least in part on the detected commit. A test data generation system accesses production data produced by a production system. The test data generation system filters the production data to produce a set of the production data. The test data generation system selects a subset of one or more parent records in the filtered set of the production data. In some embodiments, for each parent record, the test data generation system traverses a respective hierarchy of records dependent from the one or more parent records in the selected subset, where each record includes at least one attribute value. In other embodiments, the test data generation system accesses production data organized in a database comprising a plurality of tables in a database and selects a subset of the production data in the database, where the subset of production data is stored in a subset of dependent ones of the plurality of tables in the database. The test data generation system transforms one or more of the attribute values to produce one or more changed values. A test computer system tests the build of the application, where the test includes populating parameters of the application code with one or more of the attribute values and changed values.

The invention also features apparatus operable to implement the method described above and computer-readable media storing computer-readable instructions causing a computer system to implement the method described above.

For example, another embodiment features an application development system that includes a continuous integration system, a test data generation system, and a test computer system. The continuous integration system detects a commit of an application code in a repository, and compiles a build of the application based at least in part on the detected commit. The test data generation system accesses production data produced by a production system, filters the production data to produce a set of the production data, selects a subset of one or more parent records in the filtered set of the production data. In some embodiments, for each parent record, the test generation system traverses a respective hierarchy of records dependent from the one or more parent records in the selected subset where each record includes at least one attribute value. In other embodiments, the test data generation system accesses production data organized in a database comprising a plurality of tables in a database and selects a subset of the production data in the database, where the subset of production data is stored in a subset of dependent ones of the plurality of tables in the database. The test generation system transforms one or more of the attribute values to produce one or more changed values. The test computer system populates parameters of the application code commit with one or more of the attribute values and changed values, and tests the build of the application.

Another embodiment features a computer program product for execution by a computer system and comprising at least one non-transitory computer-readable medium having computer-readable program code portions embodied therein, the computer-readable program code portions, comprising: an executable code portion configured to detect a commit of an application code in a repository, wherein the commit represents a change in state of the application code; an executable code portion configured to compile a build of the application based at least in part on the detected commit; an executable code portion configured to access production data produced by a production system; an executable code portion configured to filter the production data to produce a set of the production data; an executable code portion configured to select a subset of one or more parent records in the filtered set of the production data; an executable code portion configured to transform one or more of the attribute values to produce one or more changed values; and an executable code portion configured to populate parameters of the application code with one or more of the attribute values and changed values, and test the build of the application. In some embodiments, the at least one non-transitory computer-readable medium comprises an executable code portion configured to traverse, for each parent record, a respective hierarchy of records dependent from the one or more parent records in the selected subset, wherein each record comprises at least one attribute value. In other embodiments, the at least one non-transitory computer-readable medium comprises an executable code portion configured to access production data organized in a database comprising a plurality of tables in a database and the selecting comprises selecting a subset of the production data in the database, wherein the subset of production data is stored in a subset of dependent ones of the plurality of tables in the database.

DETAILED DESCRIPTION

Introduction

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

The term "data object" refers to an addressable data file or a subset thereof.

The term "metadata" includes information about data objects or characteristics thereof.

The terms "module," "manager," and "unit" refer to hardware, software, or firmware, or a combination thereof.

Exemplary Embodiments

Figure 1:
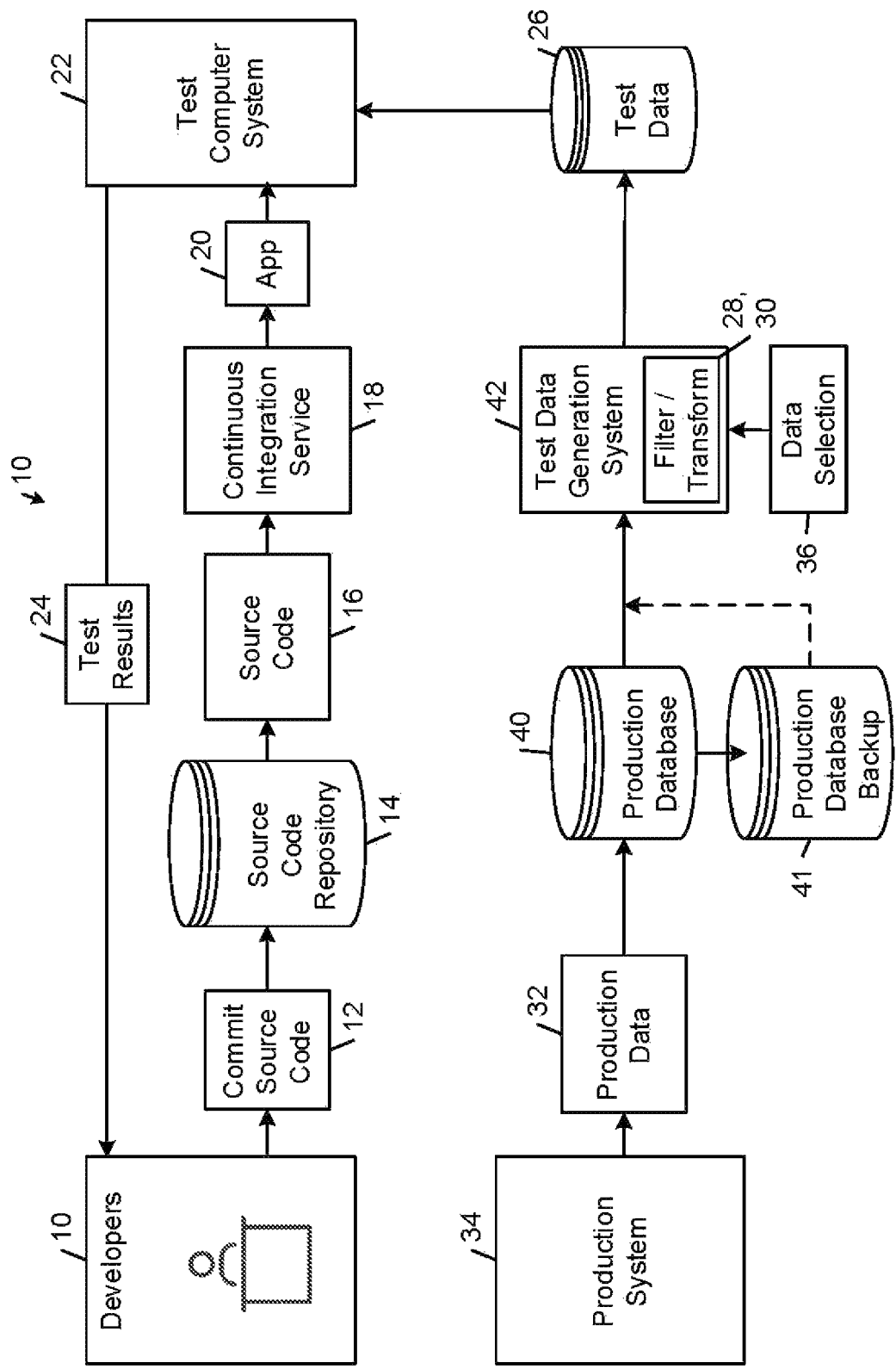
FIG. 1 is a block diagram of an example system that includes a production system that automatically generates test data for a continuous integration system.

Referring to FIG. 1, application developers 10 may use a continuous integration service 18 to build an application 20 (also referred to herein as a "System-Under-Test," or "SUT"). In some embodiments, the application 20 is installed on a dedicated computer on-site. Alternatively, the application 20 is hosted remotely and accessed through an Application Programming Interface (API) according to, for example, a System-as-a-Service (SaaS) model in accordance with which application code is installed in a development environment (e.g., a "sandbox") provided by the SaaS vendor (e.g., Salesforce). The application developers 10 may work on and commit new, updated, or untested application source code or other application-related assets to a source code repository 14 to be tested against test data 26 that is generated by a test data generation system 42 from data produced by a production system 34. As used herein in the context of software development, the qualifier "untested" is used to encompass any of the qualifiers "new," "updated," or "untested."

The continuous integration service 18 typically automatically detects source code submissions to the source code repository 14. The continuous integration service 18 compiles the application 20 either according to a predetermined schedule or in response to the detection of an application source code commit 12. As part of the application development process, one or more of the application developers 10 commit untested source code modules 12 to the source code repository 14 as they are developed. A source code module 12 may constitute a complete application or only one of multiple components or modules of an application 20. The application 20 may be, for example, a client application or a server application. Typically, the continuous integration service 18 iteratively compiles successive builds of the application 20 from one or more source code modules 12 in the source code repository 14. In this process, the continuous integration service 18 retrieves one or more of the untested source code modules 16 from the source code repository 14 and automatically integrates or compiles the one or more untested source code modules into a new build of the application 20.

The continuous integration service 18 installs or loads the application 20 on the test computer system 22 for testing one or more of the untested source code modules 12 against the test data 26. In some examples, the test computer system 22 is cloned from the production system 34. In some examples, the test computer system 22 is configured by one or more of the application developers 10 or a test engineer to run a set of predefined tests or scripts on the application 20 after each build. Each test script defines a set of operations for the test computer system 22 to perform on the application 20, either in series or in parallel. Example operations that may be performed on the untested application 20 include loading the application 20, executing the application 20, processing test data 26 with the application 20, and evaluating resource usage by the application 20, execution times for the application to complete certain tasks, application errors, and application failures.

The continuous integration service 18 automatically runs the application 20 on the test computer system 22. The test computer system 22 may be implemented by an on-site computer system or a remote development environment provided by, for example, a SaaS vendor through an API (Application Programming Interface). In either case, the test computer system 22 executes the application 20 or a discrete component (e.g., a module) of the application 20 on multiple sets of test datasets 26 and generates test results. In some examples, the test computer system 22 executes the current build of the application 20 according to testing instructions or scripts that are received from the continuous integration service 18. In some examples, the developers 10 may create the testing instructions. In some examples, the test computer system 22 executes the current build of the application 20 with the relevant input parameters of the application 20 populated with test data 26 that are generated by a test data generation system 42 from production data generated by the production system 34. In an example, the test computer system 22 runs the compiled application 20 on a plurality of test data 26 generated by the test data generation system 22 from production data 32 produced by the production system 34, and selected to produce test results 24.

The test computer system 22 collects the test results 24, and reports the test results 24 back to the associated application developers 10. The test results 24 include performance metrics obtained by executing code modules on particular datasets. Examples of such performance metrics include resource usage, execution times, errors, execution failures, or improper execution of a rule. A variety of different verification mechanisms may be used to evaluate the test results. For example, a test may be configured to detect when the application 20 fails in whole or in part. Another test may be configured to verify an assertion about the behavior of the system is maintained. For example, the number of accounts at the end of a test is twice the number of accounts at the beginning of the test. Expected results can be used to test the system in cases where some aspects of the data in the application are constant between application builds. For example, if the process of populating the parameters of the application 20 always produces five accounts, the expected result of a "count accounts" test always should be five. In some examples, the test results include alerts which may be generated by executing untested application code modules with the test data values 26. In an example, an alert is generated in response to a determination that a code module crashed. In another example, an alert is generated if the behavior of the system changes unexpectedly. For example, an alert is generated if execution of the application 20 on a particular test dataset does not produce the expected result of twice the number of accounts at the beginning of the test. In some examples, the outputs are validated against a set of predefined rules. For example, in accordance with an example rule, if seven records are applied as inputs to the application 20, then seven records are expected to be generated by the application 20.

In some examples, the test data 26 are generated by filtering 28 or transforming 30, or both filtering 28 and transforming 30, a subset of the production data 32 generated by the production system 34 using a data selection user interface 36. In some examples, the test computer system 22 executes the current build of the application 20 against the filtered 28 or transformed 30 real-world production data 32 to produce test results 24 that can be analyzed and processed by the application developers 10 to detect, for example, successes, errors, or failures in the application 20. In this process, the test computer system 22 executes an untested build of the application 20 with a plurality of test data 26 to produce test results based on datasets derived from real-world data.

One of the challenges to achieving effective continuous integration is good testing. Good testing often requires a continuous supply of high-quality and up-to-date production-like data. In some examples, there are multiple objectives for the test data. For example, the test data should reflect real-world production data as closely as possible to improve testing quality and reduce the amount of test data needed for testing and storage. In this way, the testing speed can be increased and data storage costs can be reduced. At the same time, privacy laws and regulations impose various requirements to protect against disclosure of an individual's sensitive information, such as personally identifiable information (PII), for example, name, age, social security number, driver's license number, and home address. As a result, in some cases, there is a need to test applications on high quality data that excludes personally identifiable information.

Referring back to FIG. 1, in an example, the production system 34 produces production data 32. In some examples, the production data 32 is generated when the production data 32 processes new production data sets. In some examples, the production data 32 is stored in a production database 40 and optionally in at least one backup 41 of the production database 40. A test data generation system 42 is operable to filter 28 and transform 30 the production data 32. In the illustrated example, the production data 32 that is input to the test data generation system 42 may come directly from the production database 40 or restored from the production database backup 41. The production data 32 stored in the production database 40, the at least one production database backup 41, and the test data generation system 42 constitute a test data production pipeline that feeds test data 26 to the system-under-test 22. The production system 34 is configured to continuously or repeatedly generate new production data 32. This approach increases the likelihood that the production data 32 that is input into the test data generation system 42 is up-to-date and corresponds to the current configuration of the latest build of the application 20.

Figure 2:
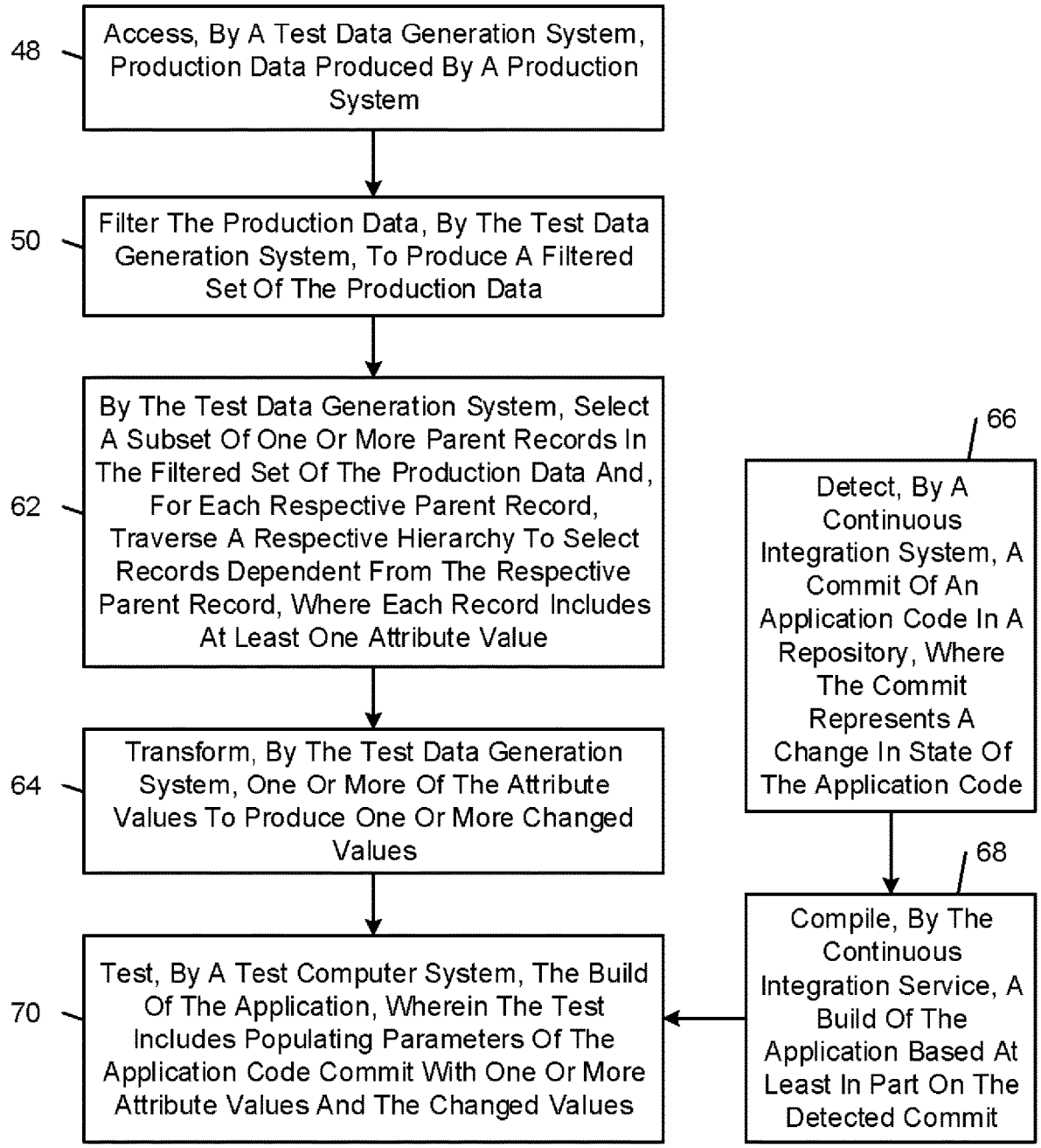
FIG. 2 is a flow diagram of an example method of building and testing an application.

FIG. 2 shows an example method of developing an application 20 with production data 32 that is processed by the test data generation system 42 (see FIG. 1). In some embodiments, the test data generation system 42 is implemented by a computer system that includes a graphical user interface for selecting test data objects from a test data source (e.g., the production database 40 or the production database backup 41). In some examples, the selected test data objects are organized as a hierarchy of objects representing data that is relevant to the performance of a particular test on the application 20.

Referring to FIG. 2, the test data generation system 42 accesses production data 32 produced by the production system 34 (FIG. 2, block 48). In some examples, the production data 32 is organized in a relational database (e.g., the production database 40 or the production database backup 41) by a computer (e.g., a server or client computer) executing a database application. In other examples, the production data 32 is organized in a non-database data storage format (e.g., JSON, XML, and NOSQL).

The test data generation system 42 filters the production data 32 to produce a filtered set of the production data 32 (FIG. 2, block 50). In this process, the test data generation system 42 automatically selects the set of production data 32 from, for example, the production database 40 or the production database backup 41. Alternatively, a developer 10 or test engineer may manually select the set of production data using, for example, a database application executing on a computer system (e.g., a client computer) to generate a graphical user interface that displays views on a database of data objects representing production data (e.g., the production database 40 or the production database backup 41). In some examples, the database application enables the user to manually select parent objects and create a replication data set that includes the selected parent objects and their respective descendant related object records. In some examples, the replicated data is migrated to a development environment hosted by, for example, a SaaS vendor.

In general, the test data generation system 42 may select the filtered set of the production data in any of a wide variety of different ways. In some embodiments, the user chooses a template from a set of predefined templates each of which defines a respective set of parent object selection criteria. In some examples, the test data generation system 42 may select the first N parent objects, the last N parent objects, a random selection of N parent objects, a set of parent objects selected by a user-defined SELECT query, or first or last, or both first and last, random N records from the result of a SQL query, where N is an integer number. After choosing the parent object selection criteria, the test data generation system 42 selects a subset of the parent objects in the production database 40 or a restored version of the production data backup database 41. In an example, the test data generation system 42 traverses the hierarchy of objects dependent from the selected parent records to construct complete hierarchies of objects under the respective parent objects. In this process, the test data generation system 42 determines the tables that are related to the selected subset of the parent records in the production database 40 or the restored version of the production database backup 41.

Figure 3:
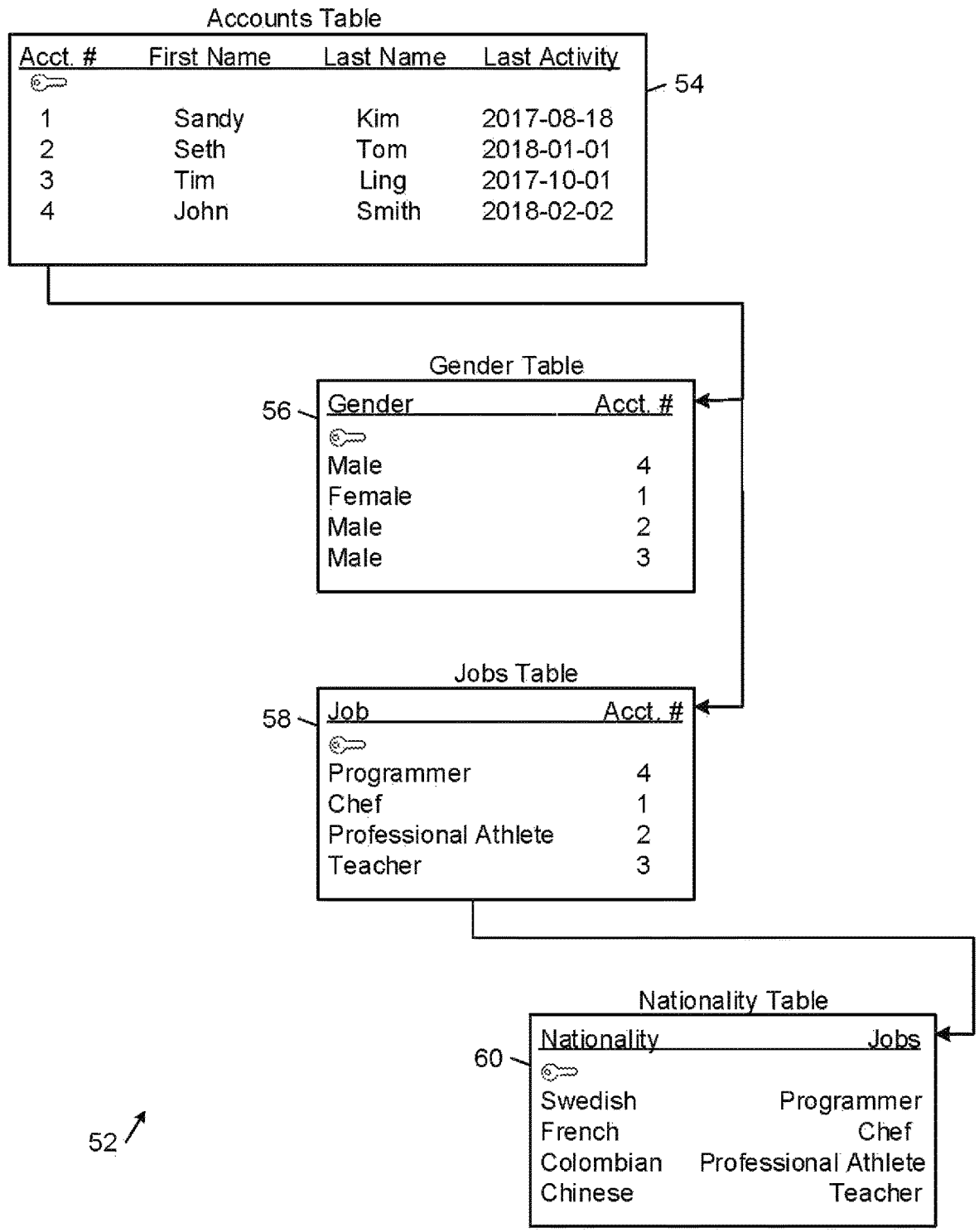
FIG. 3 is a block diagram of data organized in a plurality of related tables.

FIG. 3 shows an exemplary schematic representation of a database 52 that is organized into a set of tables 54, 56, 58,

60 and their respective dependencies according to a particular schema. In the illustrated example, the tables 54, 56, 58, 60 include an Accounts Table 54, an Gender Table 56, a Jobs Table 58, and a Nationality Table 60. The Accounts Table 54 has an Account Number attribute, a First Name attribute, a Last Name attribute, and a Last Activity attribute that contains the date of last activity date associated with the corresponding Account Number, where the Account Number is a primary key that uniquely identifies each row of the Accounts Table 54. The Gender Table 56 has a Gender attribute and an Account Number attribute, where Gender is a primary key that uniquely identifies each row in the Gender Table 56 and the Account Number is a foreign key that cross-references the Accounts Table 54. The Jobs Table 58 has a Job attribute and an Account Number attribute, where Job is a primary key that uniquely identifies each row in the Jobs Table 58 and the Account Number is a foreign key that cross-references the Accounts Table 54. The Nationality Table 60 has a Nationality attribute and a Jobs attribute, where the Nationality is a primary key that uniquely identifies each row in the Nationality Table 60 and the Jobs Table 58 is a foreign key that cross-references the Nationality Table 60.

Referring back to FIG. 2, in some embodiments, the test data generation system 42 automatically selects a subset of one or more parent records in the filtered set of the production data 32 and, for each parent record, the test data generation system 42 traverses a respective hierarchy to select records dependent from the respective parent record, where each record includes at least one attribute value (FIG. 2, block 62).

In an alternative embodiment, the test data generation system 42 (or some other computing device) is configured to execute a software module to access production data production data is organized in a database comprising a plurality of tables in a database generated by an application. The test data generation system 42 is configured to execute the software module to select a subset of the production data in the database, where the subset of production data is stored in a subset of dependent ones of the plurality of tables in the database.

Figure 4:
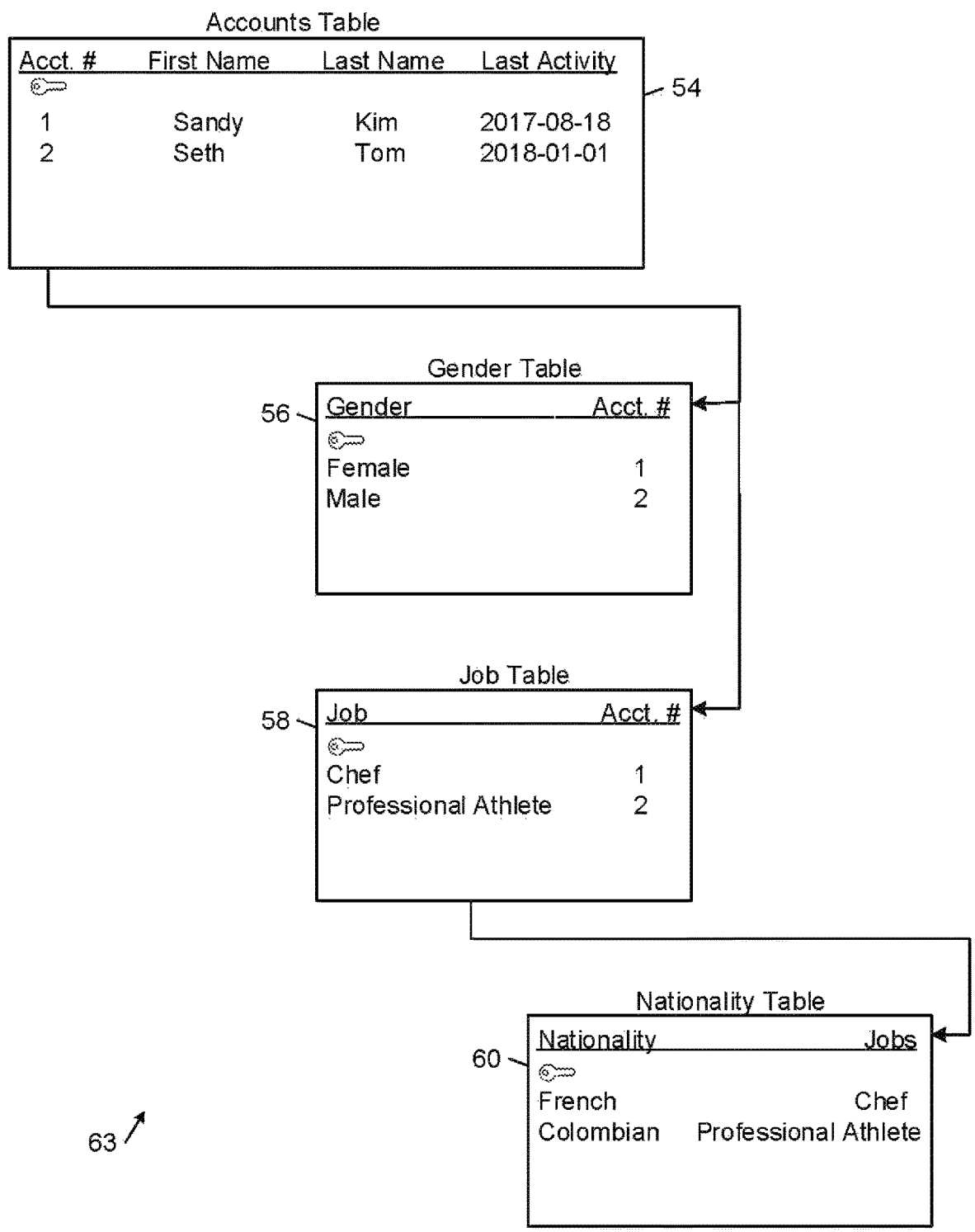
FIG. 4 is a block diagram of a filtered version of the data shown in FIG. 3.

FIG. 4 shows an exemplary selection of a subset 63 of the production data 32 that was extracted from the database 46. In this example, the subset 63 of the production data 32 corresponds to the first two parent records (i.e., Acct #1 and Acct #2, where N=2) and their respective dependent records. In this way, a user can filter out a desired amount of test data to consume less storage space and lower costs by reducing testing time, increasing the pace of software development, and thereby creating more value and a faster time to market.

Referring back to FIG. 2, after selecting the subset of records in the filtered set of the production data (FIG. 2, block 50), the test data generation system 42 transforms (30) one or more of the attribute values in the selected subset of records to produce one or more changed values (FIG. 2, block 64). In some embodiments, the test data generation system 42 is configured to execute a software module to run a query on the database, retrieve a respective record identifier and one or more respective attribute values of each record in the selected subset of production data, and transform one or more of the retrieved attribute values to produce test data.

In an embodiment, based on a query on the database 46, the test data generation system 42 retrieves a respective record identifier and one or more respective attribute values of each record in the selected subset of production data, and transforms one or more of the retrieved attribute values to produce test data. In some examples, one or more target attribute values in the selected subset of the production data are transformed into different values. For example, the recent increase in legal and administrative requirements imposed on the handling of personally identifiable information and other sensitive data has encouraged business entities that receive, use, and transmit personally identifiable information to install policies and take other measures to comply with privacy and security laws and guidelines. Examples of the legal requirements that have been enacted over the past few years include the United States' Heath Insurance Portability and Accountability Act (HIPPA), which protects a patient's medical information, and the European Union's General Data Protection Regulation (GDPR), which increases the level of control people in the European Union have over their personal data. For example, the GDPR requires companies to provide greater transparency regarding their use an individual's data, and requires security measures and controls to be put in place to protect his or her data. In addition, the GDPR affords European Union residents the "right to be forgotten" by having their data removed from companies' and other entities' records, and the right of an individual to have inaccurate personal data "rectified," or completed if it is incomplete.

Consistent with the objective of protecting an individual's rights against disclosure of sensitive information, such as personally identifiable information (PII), embodiments of the systems described herein configure the test data generation system 42 to automatically transform designated attribute values in the retrieved set of database records by, for example, anonymizing or pseudonymizing the values of one or more personal attributes, such as personally identifiable information, such as, name, age, social security number, driver's license, and home address. Anonymization may be performed by encrypting or removing personally identifiable information from a dataset so that a person remains anonymous. Pseudonymization may be performed by a variety of different techniques, including data replacement, scrambling, encryption, masking, tokenization, and data blurring.

Figure 5:
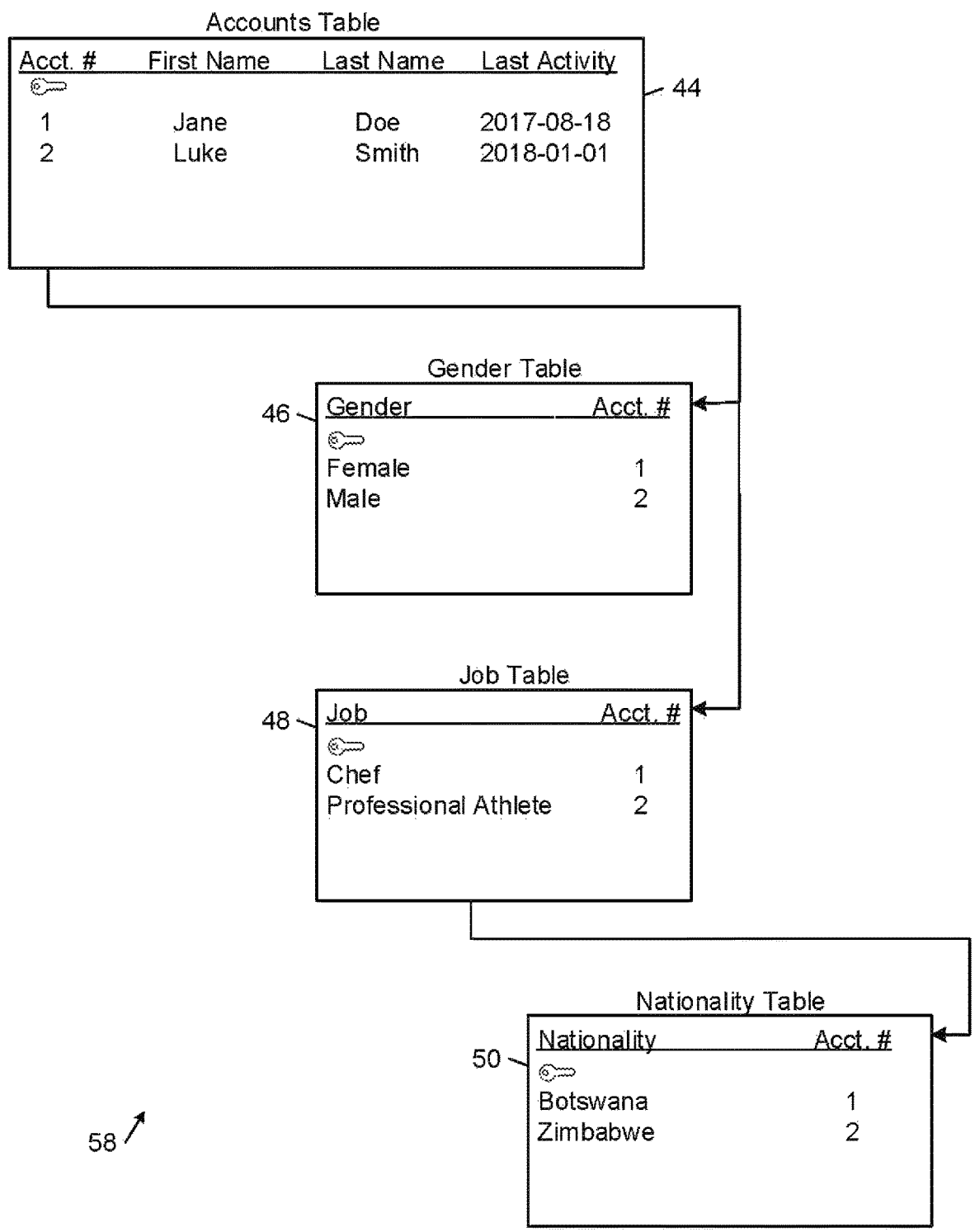
FIG. 5 is a block diagram of a transformed version of the filtered data shown in FIG. 4.

FIG. 5 shows the exemplary subset 58 of the production data 32 that was extracted from the database 46 in which personally identifiable information has been transformed by, for example, anonymization or pseudonymization techniques. In the illustrated example, the first names and last names in the Accounts Table 44 have been transformed by replacing the first and last name attribute values in account records 1 and 2 with randomly selected names. In addition, the nationalities listed in the Nationality Table 50 have been replaced with randomly selected nationality attribute values. The filtered and transformed set of selected database records can be used by the continuous integration service to test builds of the application 20 without raising privacy concerns.

Referring back to FIGS. 1 and 2, in some examples, the continuous integration service 18 automatically detects a commit of an application source code in a source code repository 14 (FIG. 2, block 66). In this process, the continuous integration service 18 typically retrieves the application source code 16 from source code repository 14. The continuous integration service 18, compiles a build of the application based at least in part on the commit of the application source code (FIG. 2, block 66). In this process, the continuous integration service 18 constructs a build of the application 20, loads the application 20 on a test computer system 22 (e.g., a server computer system), and performs a number of tests on the application 20. The test computer system tests the build of the application, wherein the test includes populating parameters of the application code commit with one or more attribute values and the changed values (FIG. 2, block 70). In an example, the test computer system 22 runs the compiled application 20 on a plurality of test data 26 generated by the test data generation system 22 from production data 32 produced by the production system 34, and selected to produce test results 24.

Exemplary Computer Apparatus

Figure 6:
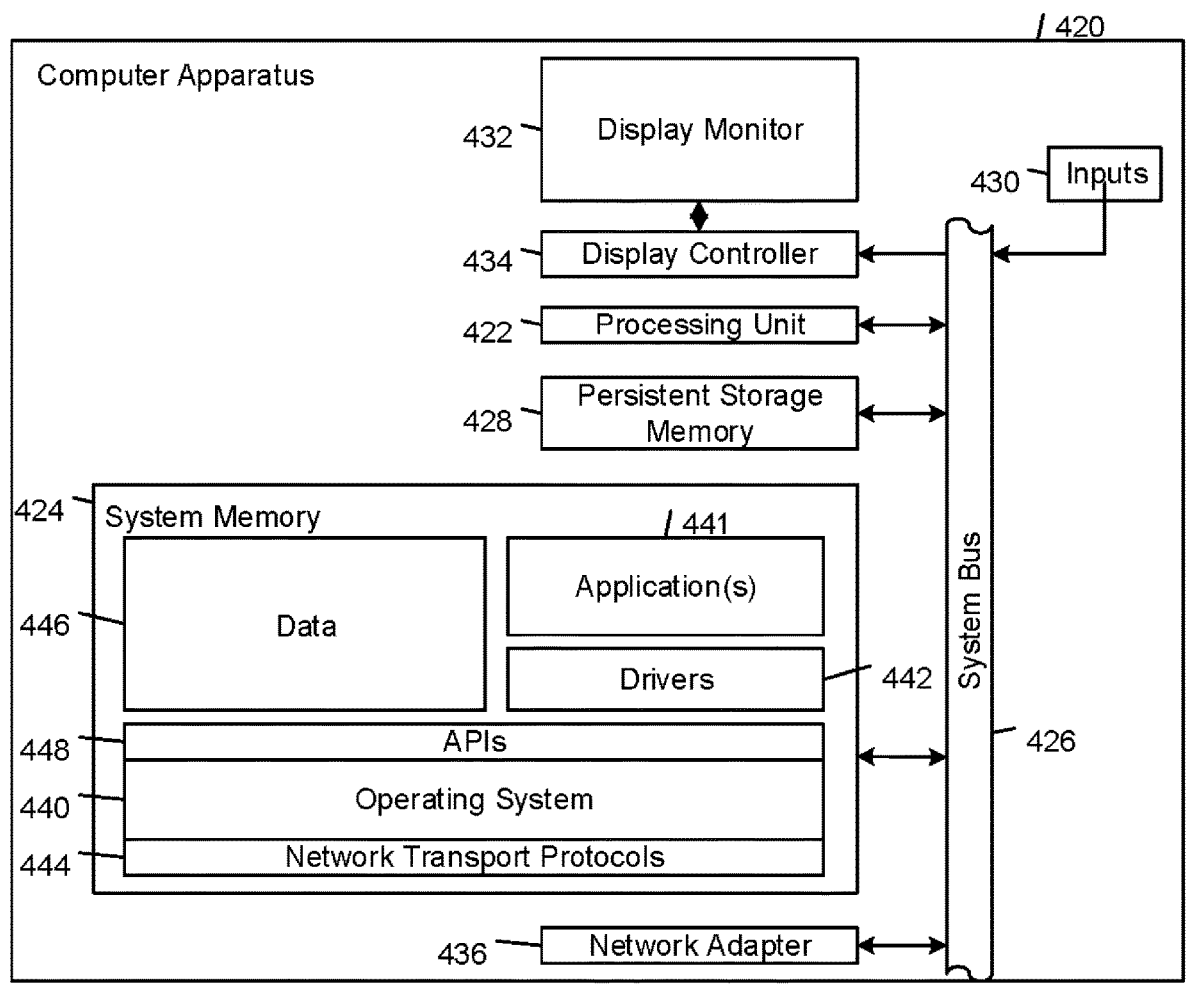
FIG. 6 is a block diagram of an example computer apparatus.

FIG. 6 shows an example embodiment of computer apparatus that is configured to implement one or more of the computing systems described in this specification. The computer apparatus 420 includes a processing unit 422, a system memory 424, and a system bus 426 that couples the processing unit 422 to the various components of the computer apparatus 420. The processing unit 422 may include one or more data processors, each of which may be in the form of any one of various commercially available computer processors. The system memory 424 includes one or more computer-readable media that typically are associated with a software application addressing space that defines the addresses that are available to software applications. The system memory 424 may include a read only memory (ROM) that stores a basic input/output system (BIOS) that contains start-up routines for the computer apparatus 420, and a random access memory (RAM). The system bus 426 may be a memory bus, a peripheral bus or a local bus, and may be compatible with any of a variety of bus protocols, including PCI, VESA, Microchannel, ISA, and EISA. The computer apparatus 420 also includes a persistent storage memory 428 (e.g., a hard drive, a floppy drive, a CD ROM drive, magnetic tape drives, flash memory devices, and digital video disks) that is connected to the system bus 426 and contains one or more computer-readable media disks that provide non-volatile or persistent storage for data, data structures and computer-executable instructions.

A user may interact (e.g., input commands or data) with the computer apparatus 420 using one or more input devices 430 (e.g. one or more keyboards, computer mice, microphones, cameras, joysticks, physical motion sensors, and touch pads). Information may be presented through a graphical user interface (GUI) that is presented to the user on a display monitor 432, which is controlled by a display controller 434. The computer apparatus 320 also may include other input/output hardware (e.g., peripheral output devices, such as speakers and a printer). The computer apparatus 420 connects to other network nodes through a network adapter 336 (also referred to as a "network interface card" or NIC).

A number of program modules may be stored in the system memory 424, including application programming interfaces 438 (APIs), an operating system (OS) 440 (e.g., the Windows® operating system available from Microsoft Corporation of Redmond, Wash. U.S.A.), software applications 441 including one or more software applications programming the computer apparatus 420 to perform one or more of the steps, tasks, operations, or processes of the hierarchical classification systems described herein, drivers 442 (e.g., a GUI driver), network transport protocols 444, and data 446 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

The invention claimed is:

1. A method of developing an application comprising, by one or more computing devices comprising computer hardware:
   detecting, by a continuous integration system, a commit of an application code in a repository, wherein the commit represents a change in state of the application code;
   compiling, by the continuous integration system, a build of the application based at least in part on the detected commit;
   accessing, by a test data generation system, production data produced by a production system and organized in a database comprising records stored in multiple tables, including parent records stored in a parent table and dependent records, which are dependent from respective ones of the parent records, in one or more dependent tables, each record comprising one or more attribute values;
   filtering the production data, by the test data generation system, to produce a filtered set of the production data;
   by the test data generation system, selecting a subset of the production data in the database comprising one or more of the parent records in the filtered set of the production data and a plurality of the dependent records selected by traversing a respective hierarchy of the records to choose the dependent records in one or more of the dependent tables that are dependent from each of the one or more of the parent records;
   transforming, by the test data generation system, one or more of the attribute values of the records in the selected subset to produce one or more changed values; and
   testing, by a test computer system, the build of the application, wherein the testing comprises populating parameters of the application code commit with one or more of the attribute values and changed values.

2. The method of claim 1, wherein the accessed production data is copied from source production data, and the filtering is performed on the production data copied from the source production data.

3. The method of claim 1, wherein the accessing comprises retrieving the production data from a backup copy of the production data.

4. The method of claim 1, wherein filtering the production data comprises, by the test data generation system, choosing the records to be included in the filtered set of the production data.

5. The method of claim 4, wherein choosing the records comprises applying a query on the production data to produce the filtered set of the production data.

6. The method of claim 1, wherein the selecting comprises selecting a specified number of parent records in the filtered set of the production data.

7. The method of claim 1, wherein the selecting comprises selecting one or more of parent records in the filtered set of the production data randomly.

8. The method of claim 1, wherein the transforming comprises replacing one or more of the attribute values with different respective replacement values.

9. The method of claim 8, wherein the transforming comprises anonymizing one or more of the attribute values comprising personally identifiable information.

10. An application development system, comprising:
  a continuous integration system to detect a commit of an application code in a repository, and to compile a build of the application based at least in part on the detected commit;
  a test data generation system to access production data produced by a production system and organized in a database comprising records stored in multiple tables, including parent records stored in a parent table and dependent records, which are dependent from respective ones of the parent records, in one or more dependent tables, each record comprising one or more attribute values, filter the production data to produce a filtered set of the production data, select a subset of the production data in the database comprising one or more of the parent records in the filtered set of the production data and a plurality of the dependent records selected by traversing a respective hierarchy of the records to choose the dependent records in one or more of the dependent tables that are dependent from each of the one or more of the parent records, and transform one or more of the attribute values of the records in the selected subset to produce one or more changed values; and
  a test computer system to populate parameters of the application code commit with one or more of the attribute values and changed values, and test the build of the application.

11. The application development system of claim 10, wherein the accessed production data is copied from source production data, and the test data generation system filters the production data copied from the source production data.

12. The application development system of claim 11, wherein the accessed production data is retrieved from a backup copy of the production data.

13. The application development system of claim 10, wherein the subset is selected by selecting one or more of the parent records in the filtered set of the production data randomly.

14. The application development system of claim 10, wherein the one or more of the attribute values are transformed by replacing the one or more of the attribute values with different respective replacement values.

15. The application development system of claim 10, wherein the one or more of the attribute values are transformed by anonymizing one or more of the attribute values comprising personally identifiable information.

16. A computer program product for execution by a computer system and comprising at least one non-transitory computer-readable medium having computer-readable program code portions embodied therein, the computer-readable program code portions comprising:
  an executable code portion configured to detect a commit of an application code in a repository, wherein the commit represents a change in state of the application code;
  an executable code portion configured to compile a build of the application based at least in part on the detected commit;
  an executable code portion configured to access production data produced by a production system and organized in a database comprising records stored in multiple tables, including parent records stored in a parent table and dependent records, which are dependent from respective ones of the parent records, in one or more dependent tables, each record comprising one or more attribute values;
  an executable code portion configured to filter the production data to produce a filtered set of the production data;
  an executable code portion configured to select a subset of the production data in the database comprising of one or more of the parent records in the filtered set of the production data and a plurality of the dependent records selected by traversing a respective hierarchy of the records to choose the dependent records in one or more of the dependent tables that are dependent from each of the one or more of the parent records;
  an executable code portion configured to transform one or more of the attribute values of the records in the selected subset to produce one or more changed values;
  an executable code portion configured to populate parameters of the application code commit with one or more of the attribute values and changed values; and
  an executable code portion configured to test the build of the application.

17. The computer program product of claim 16, wherein the accessed production data is copied from source production data.

18. The computer program product of claim 16, wherein the executable code portion configured to select a subset of one or more parent records in the filtered set of the production data is further configured to randomly select one or more of the parent records in the filtered set of the production data.

19. The computer program product of claim 16, wherein the executable code portion configured to transform one or more of the attribute values to produce one or more changed values is further configured to replace the one or more of the attribute values with different respective replacement values.

20. The computer program product of claim 19, wherein the executable code portion configured to transform one or more of the attribute values to produce one or more changed values is further configured to anonymize one or more of the attribute values comprising personally identifiable information.

* * * * *